(12) United States Patent
Cogen et al.

(10) Patent No.: US 10,221,298 B2
(45) Date of Patent: Mar. 5, 2019

(54) CABLE INSULATION COMPOSITIONS COMPRISING A SULFUR-CONTAINING SECOND ANTIOXIDANT

(71) Applicant: Dow Global Technologies LLC, Midland, MI (US)

(72) Inventors: Jeffrey M. Cogen, Collegeville, PA (US); Manish Talreja, Collegeville, PA (US); Timothy J. Person, Collegeville, PA (US); Raghunath Roy, Midland, MI (US); Thomas H. Peterson, Midland, MI (US); Jessica D. Drazba, Collegeville, PA (US); Neil W. Dunchus, Collegeville, PA (US); Gerrit Groot-Enzerink, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/579,478

(22) PCT Filed: May 25, 2016

(86) PCT No.: PCT/US2016/034001
§ 371 (c)(1),
(2) Date: Dec. 4, 2017

(87) PCT Pub. No.: WO2016/204950
PCT Pub. Date: Dec. 22, 2016

(65) Prior Publication Data
US 2018/0215900 A1    Aug. 2, 2018

Related U.S. Application Data

(60) Provisional application No. 62/180,937, filed on Jun. 17, 2015.

(51) Int. Cl.
*C08K 5/372* (2006.01)
*C08K 5/00* (2006.01)
*C08K 5/14* (2006.01)
*C08K 5/36* (2006.01)
*C08K 5/3435* (2006.01)
*H01B 3/44* (2006.01)
*H01B 7/295* (2006.01)
*C08L 23/04* (2006.01)

(52) U.S. Cl.
CPC ........... *C08K 5/372* (2013.01); *C08K 5/005* (2013.01); *C08K 5/14* (2013.01); *C08K 5/3435* (2013.01); *C08K 5/36* (2013.01); *H01B 3/441* (2013.01); *H01B 7/295* (2013.01); *C08L 23/04* (2013.01); *C08L 2201/08* (2013.01); *C08L 2207/066* (2013.01)

(58) Field of Classification Search
CPC ...... C08K 5/372; C08K 5/005; C08K 5/3435; C08K 5/14; H01B 7/295; H01B 3/441; C08L 23/04; C08L 2201/08; C08L 2207/066
See application file for complete search history.

(56) References Cited

U.S. PATENT DOCUMENTS

| | | |
|---|---|---|
| 4,018,852 A | 4/1977 | Schober |
| 4,857,600 A | 8/1989 | Gross et al. |
| 5,246,783 A | 9/1993 | Spenadel et al. |
| 5,272,236 A | 12/1993 | Lai et al. |
| 5,278,272 A | 1/1994 | Lai et al. |
| 5,346,961 A | 9/1994 | Shaw et al. |
| 5,575,965 A | 11/1996 | Caronia et al. |
| 5,986,028 A | 11/1999 | Lai et al. |
| 6,187,847 B1 | 2/2001 | Cogen et al. |
| 6,187,858 B1 | 2/2001 | Tachikawa et al. |
| 6,496,629 B2 | 12/2002 | Ma et al. |
| 6,656,986 B2 | 12/2003 | Caronia et al. |
| 6,714,707 B2 | 3/2004 | Rossi et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 2015/0299494 A1 | 10/2015 | Sun et al. |

*Primary Examiner* — Michael C Miggins
(74) *Attorney, Agent, or Firm* — Husch Blackwell LLP

(57) ABSTRACT

The process for making extra high voltage cable insulation is improved by using a composition comprising in weight percent based on the weight of the composition: (A) 95 to 99.9% of an ethylene-based polymer; (B) 0.2 to 2.5% peroxide; (C) 0.01 to 0.5% of a sulfur-containing first antioxidant having at least one —S(CH$_2$)$_2$CO$_2$R group, wherein R is C6 to C20 alkyl; (D) 0.001 to 0.009%) of a sulfur-containing second antioxidant that does not contain a —S(CH$_2$)$_2$CO$_2$R group, wherein R is a C6 to C20 alkyl; (E) Optionally, an organic nitrogenous base; and (F) Optionally, a phenolic third antioxidant that does not contain a —S(CH$^2$)$_2$CO$_2$R group, wherein R is a C6 to C20 alkyl.

13 Claims, No Drawings

CABLE INSULATION COMPOSITIONS COMPRISING A SULFUR-CONTAINING SECOND ANTIOXIDANT

FIELD OF THE INVENTION

This invention relates to cable insulation compositions. In one aspect the invention relates to cable insulation compositions comprising a sulfur-containing antioxidant while in another aspect, the invention relates to cable insulation compositions comprising a sulfur-containing antioxidant and a sulfur-containing second antioxidant. In yet another aspect the invention relates to a cable comprising a sheath made from the composition.

BACKGROUND OF THE INVENTION

Peroxide crosslinkable insulation compounds for extra high voltage (EHV) cable applications must be melt-filtered through fine screens during extrusion. U.S. Pat. Nos. 6,187,847 and 6,187,858 describe insulation formulations that have excellent properties, except that they suffer from peroxide instability during storage and exhibit high levels of water during crosslinking. U.S. Pat. No. 6,656,986 teaches that certain amine bases can mitigate these issues if they are included in the composition during extrusion. However, despite their excellent properties, manufacturing trials with the formulations described in U.S. Pat. No. 6,656,986 have identified a rapid pressure development due to fouling of the fine, e.g., less than 50 microns (µm), screen required to achieve EHV levels of cleanliness. This results in reduced run lengths and reduced yields of EHV grade, since long runs are required to achieve high EHV yields. This screen fouling phenomenon has not been appreciated in the prior art.

U.S. Pat. No. 8,455,580 describes compositions containing:
(A) Ethylene-based polymer;
(B) Polyalkylene glycol;
(C) 0.1-1% of a tertiary hindered amine stabilizer;
(D) Sulfur-containing hindered phenol antioxidant at 0.1% or greater;
(E) Peroxide; and
(F) Optional coagent.
This disclosure does not teach use of a first sulfur-containing antioxidant having at least one —S(CH$_2$)$_2$CO$_2$R group in combination with a second sulfur-containing antioxidant, and it does not teach the relative amounts of the antioxidants and stabilizers required by the present invention.

SUMMARY OF THE INVENTION

In one embodiment the invention is a power cable insulation composition comprising a sulfur-containing first antioxidant in a relatively high amount and a sulfur-containing second antioxidant in a relatively low amount.

In one embodiment the invention is a composition comprising in weight percent based on the weight of the composition:
(A) 95 to 99.9% of an ethylene-based polymer;
(B) 0.2 to 2.5% peroxide;
(C) 0.01 to 0.5% of a sulfur-containing first antioxidant having at least one —S(CH$_2$)$_2$CO$_2$R group, wherein R is C6 to C20 alkyl;
(D) 0.001 to 0.009% of a sulfur-containing second antioxidant that does not contain a —S(CH$_2$)$_2$CO$_2$R group, wherein R is a C6 to C20 alkyl;
(E) Optionally, an organic nitrogenous base; and
(F) Optionally, a phenolic third antioxidant that does not contain a —S(CH$_2$)$_2$CO$_2$R group, wherein R is a C6 to C20 alkyl.

In one embodiment the invention is a cable comprising a sheath made from the inventive composition.

In one embodiment the inventive composition is free of polyalkylene glycol.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of the individual components in the composition.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

"Wire" and like terms mean a single strand of conductive metal, e.g., copper or aluminum, or a single strand of optical fiber.

"Cable," "power cable," and like terms means at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc. can be designed for low, medium, high and extra high voltage applications. For purposes of this disclosure, low voltage means less than 5 kilovolts (kV), medium voltage means 5 kV to less than 69 kV, high voltage means 69 kV to less than 220 kV, and extra high voltage means greater than or equal to 220 kV. Typical cable designs are illustrated in U.S. Pat. Nos. 5,246,783; 6,496,629 and 6,714,707.

"Composition" and like terms mean a mixture or blend of two or more components.

"Polymer" means a compound prepared by polymerizing monomers, whether of the same or a different type. The generic term polymer thus embraces the term homopolymer, usually employed to refer to polymers prepared from only one type of monomer, and the terms "interpolymer" and "copolymer".

"Interpolymer", "copolymer" and like terms means a polymer prepared by the polymerization of at least two different types of monomers. These generic terms include copolymers, usually employed to refer to polymers prepared from two different types of monomers, and polymers prepared from more than two different types of monomers, e.g., terpolymers, tetrapolymers, etc.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Ethylene-based polymer", "ethylene polymer", "ethylenic polymer", "ethylene-based interpolymer" and like terms refer to a polymer that comprises a majority amount of polymerized ethylene based on the weight of the polymer and, optionally, may comprise at least one comonomer.

"Tubular LDPE" and like terms mean a low density polyethylene made in a process employing at least one tubular reactor.

"Crosslinkable", "curable" and like terms means that the polymer, before or after extrusion, is not cured or crosslinked and has not been subjected or exposed to treatment that has induced substantial crosslinking although the polymer comprises additive(s) or functionality which will cause or promote substantial crosslinking upon subjection or exposure to such treatment (e.g., peroxide).

"Crosslinked", "cured" and similar terms mean that the polymer, before or after it is extruded onto a wire or cable, was subjected or exposed to a treatment which induced crosslinking and has xylene or decalene extractables of less than or equal to 90 weight percent (i.e., greater than or equal to 10 weight percent gel content).

"Free of polyalkylene glycol" and like terms means that the inventive composition contains less than 0.1 wt %, or less than 0.05 wt %, or less than 0.01 wt %, of a polyalkylene glycol.

"Room temperature" and like terms mean 23° C.

Ethylene-Based Polymer

The ethylenic polymers used in the practice of this invention include both homopolymers and interpolymers, random and blocky copolymers, and functionalized (e.g., ethylene vinyl acetate, ethylene ethyl acrylate, etc.) and non-functionalized polymers. The ethylenic interpolymers include elastomers, flexomers and plastomers. The ethylene polymer comprises at least 50, preferably at least 60 and more preferably at least 80, wt % of units derived from ethylene. The other units of the ethylenic interpolymer are typically derived from one or more alpha-olefins.

The alpha-olefin is preferably a $C_{3-20}$ linear, branched or cyclic alpha-olefin. Examples of $C_{3-20}$ alpha-olefins include propene, 1-butene, 4-methyl-1-pentene, 1-hexene, 1-octene, 1-decene, 1-dodecene, 1-tetradecene, 1-hexadecene, and 1-octadecene. The alpha-olefins also can contain a cyclic structure such as cyclohexane or cyclopentane, resulting in an alpha-olefin such as 3-cyclohexyl-1-propene (allyl cyclohexane) and vinyl cyclohexane. Although not alpha-olefins in the classical sense of the term, for purposes of this invention certain cyclic olefins, such as norbornene and related olefins, particularly 5-ethylidene-2-norbornene, are alpha-olefins and can be used in place of some or all of the alpha-olefins described above. Similarly, styrene and its related olefins (for example, alpha-methylstyrene, etc.) are alpha-olefins for purposes of this invention. Illustrative ethylenic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

Examples of ethylenic polymers useful in the practice of this invention include high density polyethylene (HDPE); medium density polyethylene (MDPE); low density polyethylene (LDPE); very low density polyethylene (VLDPE); homogeneously branched, linear ethylene/alpha-olefin copolymers (e.g. TAFMER™ by Mitsui Petrochemicals Company Limited and EXACT™ by DEX-Plastomers); homogeneously branched, substantially linear ethylene/alpha-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are more fully described in U.S. Pat. Nos. 5,272,236; 5,278,272 and 5,986,028, and the ethylene block copolymers are more fully described in U.S. Pat. Nos. 7,579,408; 7,355,089; 7,524,911; 7,514,517; 7,582,716 and 7,504,347.

Olefinic interpolymers of particular interest for use in the practice of this invention are LDPE, linear low density polyethylene (LLDPE) and HDPE. These ethylenic copolymers are commercially available from a number of different sources including The Dow Chemical Company under such trademarks as DOWLEX™, ATTANE™ and FLEXOMER™.

One preferred polymer is a high pressure low density polyethylene (LDPE). One conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of 10,000 to 30,000 psi (70 to 210 kPa) and the temperature is in the range of 175 to 250° C., and in the tubular reactor, the pressure is in the range of 25,000 to 45,000 psi (170 to 310 kPa) and the temperature is in the range of 200 to 350° C.

The amount of ethylene polymer present in the compositions of this invention is typically of 95 to 99.9, more typically 95-99 and even more typically 96-99, wt % based on the total weight of the composition. The ethylene polymer can be present as a single polymer, e.g., LDPE, or as a blend of two or more polymers, e.g., LDPE and MDPE.

In one embodiment, the ethylene-based polymer is a low density polyethylene (LDPE) made in a tubular reactor.

In one embodiment, the ethylene-based polymer has a melt index ($I_2$) from 0.1 to 100 grams per 10 minutes (g/10 min). In one embodiment, the ethylene-based polymer has an $I_2$ from 0.3 to 100 g/10 min, or from 0.5 to 30 g/10 min, or from 1.0 to 10 g/10 min. In one embodiment, the ethylene-based polymer has an $I_2$ from 0.3 to 100 g/10 min, or from 1 to 50 g/10 min, or from 2 to 20 g/10 min. Melt index is measured according to ASTM D1238, Condition 190° C./2.16 kg.

In one embodiment the ethylene-based polymer has a density greater than or equal to 0.910, or greater than or equal to 0.914, or greater than or equal to 0.916 g/cc. Density is measured by the procedure of ASTM D792, Method B. The result is recorded in grams (g) per cubic centimeter, or g/cc or g/cm$^3$.

In one embodiment the ethylene-based polymer has a density less than or equal to 0.940, or less than or equal to 0.935, or less than or equal to 0.932, grams per cubic centimeter (g/cc or g/cm$^3$).

In one embodiment the ethylene-based polymer has a density from 0.910 to 0.940. In one embodiment, the ethylene-based polymer has a density from 0.910 to 0.940, or from 0.915 to 0.935, or from 0.916 to 0.932 g/cc.

Preferably, in one embodiment the ethylene-based polymer has a density from 0.912 to 0.940, or from 0.915 to 0.935, or from 0.920 to 0.930, or from 0.918 to 0.926 g/cc.

In one embodiment, the ethylene-based polymer has a density of from 0.916 to 0.940, or from 0.916 to 0.921, or from 0.920 to 0.924, or from 0.923 to 0.940.

In one embodiment, the ethylene-based polymer has a density from 0.920 to 0.940 g/cc.

Peroxide

The peroxides that can be used in the practice of this invention include, but are not limited to, cyclic peroxides, diacyl peroxides, dialkyl peroxides, hydroperoxides, peroxycarbonates, peroxydicarbonates, peroxyesters, and peroxyketals. Representative peroxides include dicumyl peroxide; bis(alpha-t-butyl-peroxyisopropyl)benzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; di(isopropylcumyl) peroxide; and mixtures of two or more such initiators. Examples of commercially available peroxides include, but are not limited to, TRIGONOX™ 301 (3,6,9-triethyl-3,6,9-trimethyl-1,4,7-triperoxonaan) and TRIGONOX™ 311 (3,3,5,7, 7-pentamethyl-1,2,4-trioxepane), both available from Akzo Nobel, and HMCH-4-AL (3,3,6,6,9,9-hexamethyl-1,2,4,5-tetroxonane) available from United Initiators. See also WO 02/14379 and WO 01/68723.

In one embodiment the peroxide is used in an amount from 0.2-2.5 wt %, or from 0.2-2.0 wt %, based upon the weight of composition.

In one embodiment, the peroxide is used in combination with a curing coagents (and, optionally, one or more boosters or retarders). Representative coagents include triallyl isocyanurate; ethoxylated bisphenol A dimethacrylate; alpha-methyl styrene dimer (AMSD); and the other coagents described in U.S. Pat. Nos. 5,346,961 and 4,018,852. Coagents are used, if used at all, typically in amounts of greater than 0 (e.g., 0.01) to 3, more typically 0.1 to 0.5 and even more typically 0.2 to 0.4, wt % based on the weight of the composition.

Sulfur-Containing Antioxidant

The sulfur-containing antioxidants used in the practice of this invention have at least one —S(CH$_2$)$_2$CO$_2$R group in which R is C6 to C20 alkyl. In preferred embodiments R is C$_{18}$H$_{37}$ or C$_{12}$H$_{25}$.

Examples of sulfur-containing antioxidants include but are not limited to: dimyristyl-thiodipropionate; distearylthiodipropionate (DSTDP); dilauryl thiodipropionate (DLTDP); and pentaerythritol tetrakis (B-laurylthiopropionate). Additional examples can be found in *Plastic Additives Handbook*, Gachter et al, 1985. These sulfur-containing antioxidants are typically used in amounts of 0.01 to 0.5 wt %, more typically in amounts of 0.05 to 0.30 wt % based on the weight of the composition. Preferred embodiments include the thioesters DSTDP, DLTDP and NAUGARD™ 412S (pentaerythritol tetrakis(β-laurylthiopropionate). In one embodiment, the sulfur-containing first antioxidant is present in an amount from 0.01 to 0.5 wt %, or from 0.10 to 0.30 wt %, based on the weight of the composition.

Sulfur-Containing Second Antioxidant

The sulfur-containing second antioxidant does not contain a —S(CH$_2$)$_2$CO$_2$R group in which R is C6 to C20 alkyl. In one embodiment, the sulfur-containing second antioxidant does not contain phosphorus. Examples of suitable second sulfur containing antioxidants include LOWINOX™ TBM-6 (4,4'-thiobis (2-t-butyl-5-methylphenol); IRGANOX™ 1035 (thiodiethylene bis[3-(3,5-di-tert-butyl-4-hydroxyphenyl)propionate]); IRGANOX™ 1081 (6,6'-Di-tert-butyl-2,2'-thiodi-p-cresol); IRGASTAB KV10™ (4,6-bis (octylthiomethyl)-o-cresol); and LOWINOX™ TBP-6 (2,2'-thiobis(6-t-butyl-4-methylphenol). This second antioxidant may be a mixture of two or more sulfur-containing antioxidants that do not contain a —S(CH$_2$)$_2$CO$_2$R group, wherein R is a C6 to C20 alkyl. In one embodiment, the sulfur-containing second antioxidant is present in an amount from 0.001 to 0.05 wt % based on the weight of the composition. In another embodiment, the sulfur-containing second antioxidant is present in an amount from 0.001 to 0.03 wt % based on the weight of the composition. In a preferred embodiment, the sulfur-containing second antioxidant is present in an amount from 0.001 to 0.009 wt %, or more preferably from 0.003 to 0.007 wt %, based on the weight of the composition.

Nitrogenous Base

In one embodiment of the invention, the composition comprises a nitrogenous base. In one embodiment the nitrogenous base is triallyl cyanurate. In one embodiment the nitrogenous base is UVINUL™ 4050 H (N,N'-bis(2,2, 6,6-tetramethyl-4-piperidyl)-N,N'-diformylhexamethylene-diamine). In one embodiment the nitrogenous base is a hindered amine stabilizer (HAS). Examples of HAS include but are not limited to: TINUVIN™ XT 850, TINUVIN™ 622, TINUVIN™ 144, SANDUVOR™ PR-31 and CHIMASSORB™ 119 FL. TINUVIN™ 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole (g/mol), contains tertiary amines, and is also available from BASF. SANDUVOR™ PR-31 is propanedioic acid, [(4-methoxyphenyl)-methylene]-bis-(1,2,2, 6,6-pentamethyl-4-piperidinyl)ester, has a molecular weight of about 529 g/mol, contains tertiary amines, and is available from Clariant Chemicals (India) Ltd. CHIMASSORB™ 119 FL or CHIMASSORB™ 119 is 10 wt % of dimethyl succinate polymer with 4-hydroxy-2,2,6,6,-tetramethyl-1-piperidineethanol and 90 wt % of N,N'''-[1,2-Ethanediylbis [[[4,6-bis[butyl(1,2,2,6,6-pentamethyl-4-piperidinyl) amino]-1,3,5-traizin-2-yl]imino]-3,1-propane-diyl]]bis [N'N''-dibutyl-N'N''-bis(1,2,2,6,6-pentamethyl-4- piperidinyl)]-1 and is commercially available from BASF. The optional nitrogenous base, if present, is typically present in an amount of 0.001-0.09 wt %, or 0.001-0.03 wt %, or 0.002-0.01 wt %, based on the weight of the composition. In one embodiment, the nitrogenous base does not contain sulfur. In one embodiment, the nitrogenous base does not contain a —S(CH$_2$)$_2$CO$_2$R group, wherein R is a C6 to C20 alkyl. In one embodiment the nitrogenous base does not contain phosphorus. In one embodiment the nitrogenous base contains neither sulfur nor phosphorus.

Phenolic Third Antioxidant

In one embodiment of the invention, the composition comprises a phenolic third antioxidant. Examples of phenolic antioxidants, include but are not limited to, hindered phenolic antioxidants such as IRGANOX™ 1010 (tetrakis [methylene(3,5-di-tert-butyl-4-hydroxyhydro-cinnamate)] methane); CYANOX™ 1790 (1,3,5-tris(4-tert-butyl-3-hydroxy-2,6-dimethyl benzyl)-1,3,5-triazine-2,4,6-(1H,3H,5H)-trione); 1,3,5-tris (3',5'-di-tert-butyl-4'-hydroxybenzyl)-2,4,6-trimethyl benzene; 1,3,5-tri (3',5'-di-tert-butyl-4'-hydroxybenzyl) isocyanurate); octadecyl 3-(3',5'-di-tert-butyl-4'-hydroxyphenyl)propionate; 2,5-distyrylnonylphenol; and 1,1,3-tris(2'-methyl-4'-hydroxy-5'-tert-butylphenyl) butane. Preferred phenolic antioxidants include CYANOX™ 1790 and IRGANOX™ 1010. In one embodiment, the optional phenolic antioxidant does not contain sulfur. The optional phenolic antioxidant, if present, is typically present in an amount of 0.05-0.5 wt %, or 0.1-0.3 wt % based on the weight of the composition.

Fillers and Additives

The composition may contain additives including but not limited to processing aids, fillers, coupling agents, ultraviolet absorbers, antistatic agents, nucleating agents, slip agents, plasticizers, lubricants, viscosity control agents, tackifiers, anti-blocking agents, surfactants, extender oils, acid scavengers, and metal deactivators. Additives, other than fillers, are typically used in amounts ranging from 0.01 or less to 10 or more wt % based on the weight of the composition. Fillers are generally added in larger amounts although they the amount can range from as low as 0.01 or less to 50 or more wt % based on the weight of the composition. Examples of fillers include but are not limited to clays, precipitated silica and silicates, fumed silica, calcium carbonate, ground minerals, and carbon blacks. The fillers typically have an arithmetic mean particle size larger than 15 nanometers.

Compounding and Fabrication

Compounding of a cable insulation material can be effected by standard equipment known to those skilled in the art. Examples of compounding equipment are internal batch mixers, such as a BANBURY™ or BOLLING™ internal mixer. Alternatively, continuous single, or counter and/or co-rotating twin screw, mixers can be used, such as FARREL™ continuous mixer, a WERNER AND PFLEIDERER™ twin screw mixer, or a BUSS™ kneading continuous extruder.

A cable containing an insulation layer comprising a composition of the invention can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200 to about 350° C., preferably in the range of about 170 to about 250° C. The heated zone can be heated by pressurized steam, or inductively heated pressurized nitrogen gas.

The invention is illustrated by the following examples.

EXAMPLES

Test Methods

Melt index (MI) measurement for polyethylene is performed according to ASTM D1238, Condition 190° C./2.16 kilogram (kg) weight, formerly known as "Condition E" and also known as I$_2$, and is reported in grams eluted per 10 minutes. Melt index is inversely proportional to the molecular weight of the polymer. Thus, the higher the molecular weight, the lower the melt index, although the relationship is not linear.

Density is measured by the procedure of ASTM D792, Method B. The result is recorded in grams (g) per cubic centimeter, or g/cc.

MH (maximum torque) is measured on a moving die rheometer (MDR) according to ASTM D-5289. To measure the peroxide stability in the composition during storage, pellets of un-cured peroxide-containing samples are placed in an oven at 70° C. and the cure potential (MH) is analyzed periodically by removing some of the sample and testing on the MDR.

Plaques are crosslinked, die-cut into 3.5" diameter specimens, degassed in a vacuum over at 60° C. for a minimum of 4 days, then evaluated for dissipation factor (df) using a Soken Schering Bridge set up. df Testing is carried out according to ASTM D150 at 60 Hz (at temperatures and electrical stresses indicated in the Tables).

For AC breakdown strength (ACBD) measurements, compression molded plaques are cured and cooled under pressure to a target 40 mil thickness. AC breakdown strength measurements are conducted with a Hipotronics AC test unit according to ASTM D-149. The sample is placed between two opposing cylindrical electrodes of 0.5" diameter surrounded by Exxon Univolt N61 oil. A voltage ramp of 500V/second is employed until breakdown.

Materials

PE1 is an additive-free LDPE (melt index 2.1 dg/min, density 0.92 g/cm$^3$).

CYANOX™ 1790 is 1,3,5-tris(4-tert-butyl-3-hydroxy-2,6-dimethyl benzyl)-1,3,5-triazine-2,4,6-(1H,3H,5H)-trione available from Cytec Industries Inc.

DSTDP is distearylthiodipropionate and is available as CYANOX™ STDP from Cytec Industries, Inc.

TBM6 (i.e., LOWINOX™ TBM-6) is 4,4'-thiobis(2-t-butyl-5-methylphenol) available from Chemtura (Crompton-Uniroyal Chemical).

IRGANOX™ 1035 is thiodiethylene bis(3,5-di-tert-butyl-4-hydroxyhydrocinnamate) available from BASF TBP-6 (i.e., LOWINOX™ TBP-6) is 2,2'-thiobis(6-t-butyl-4-methylphenol) available from Chemtura (Crompton-Uniroyal Chemical).

Dicumylperoxide is available from Akzo-Nobel.

Sample Preparation

Comparative Example 1 is a prior art formulation described in U.S. Pat. Nos. 6,187,847 and 6,187,858. Inventive examples 1 through 3 include various embodiments of the invention with the sulfur-containing second antioxidant at a level of 75 parts per million (ppm). Comparative Examples 2 and 3 have a phosphorus-containing second antioxidant at much higher levels, typical of how they are used in general polyethylene stabilization applications.

All formulations are prepared with PE1 (additive-free LDPE). Additives that are contained at >0.1 wt % of the formulation are added directly while the ones that are contained at <0.1 wt % of the formulation are added via masterbatches to ensure correct loading. Masterbatches are prepared in a 265 g BRABENDER™ bowl at 180° C., 30 revolutions per minute (rpm), with cam blades. Additives are added when the resin starts to flux, and are mixed for 3 minutes. The compounded masterbatches are shredded and then pelletized prior to use to make the final formulations. The inventive formulations 1-8 and comparative formulations 1-5 are first compounded in a 265 g BRABENDER™ bowl at 180° C., 30 rpm, with cam blades. Subsequently, these are passed through a single screw extruder for further homogenization. The single screw extruder contains a 'pineapple' mixing head and is operated at 100 rpm with a target melt temperature of 200° C. Strands from the extruder are water cooled and pelletized. Pellets are preheated in the oven for four hours at 70° C. and are soaked with 1.8% peroxide by tumble rolling for 10 minutes followed by overnight soaking in an oven at 70° C.

Formulations and Results

The example formulations and results are reported in Table 1 below.

MH (maximum torque) is a measure of crosslinking, the higher the value the higher the degree of crosslinking. Ideally, the MH will not show a significant decline during aging of un-crosslinked peroxide-containing pellets. This is used to provide prediction of shelf life at room temperature. After one week of aging Comparative Example 1 shows a large rate of MH loss of 21% per week (79% retained) while the Inventive Examples 1 through 3 show negligible loss of MH. This improved stability is achieved without any significant sacrifice in AC breakdown strength or undesired increase in dissipation factor versus Comparative Example 1. The fact that such a low level of sulfur-containing second antioxidant can improve these properties is surprising, considering that their normal purpose for use in polyolefins is at much higher use levels for thermo-oxidative stabilization (long term heat aging). In fact, at the low use levels of the current invention, long term heating aging, as measured by retention of tensile strength and elongation upon aging at 150° C. in air, would not be significantly improved by the presence of the sulfur-containing second antioxidant, i.e. long term heat aging performance in inventive examples 1 through 3 would not be improved relative to Comparative example 1. Comparative Examples 2 and 3 show that when the additional antioxidant (here phosphorus rather than sulfur-containing second antioxidant) is used at conventional levels a good balance of properties is not obtained (Comparative Example 2 giving insufficient cure and Comparative Example 3 having high dissipation factor).

What is claimed is:

1. A composition comprising in weight percent based on the weight of the composition:
   (A) 95 to 99.9% of an ethylene-based polymer;
   (B) 0.2 to 2.5% peroxide;
   (C) 0.01 to 0.5% of a sulfur-containing first antioxidant having at least one —S(CH$_2$)$_2$CO$_2$R group, wherein R is C6 to C20 alkyl;

TABLE 1

Formulations and Test Results of Inventive Examples 1-3 and Comparative Examples 1-5

| | Comparative Example 1 | Inventive Example 1 | Inventive Example 2 | Inventive Example 3 | Comparative Example 2 | Comparative Example 3 |
|---|---|---|---|---|---|---|
| PE1 | 97.83 | 97.82 | 97.82 | 97.82 | 97.60 | 97.60 |
| CYANOX ™ 1790 | 0.14 | 0.14 | 0.14 | 0.14 | 0.14 | 0.14 |
| DSTDP | 0.23 | 0.23 | 0.23 | 0.23 | 0.23 | 0.23 |
| TBM6 | | 0.0075 | | | | |
| IRGANOX ™ 1035 | | | 0.0075 | | | |
| IRGAFOS ™ 126 | | | | | 0.23 | |
| IRGAFOS ™ 168 | | | | | | 0.23 |
| TBP-6 | | | | 0.0075 | | |
| Dicumylperoxide | 1.8 | 1.8 | 1.8 | 1.8 | 1.8 | 1.8 |
| MH (IN-lb) 0 days/70° C. | 2.66 | 2.60 | 2.40 | 2.24 | 1.08 | 2.27 |
| MH (IN-lb) 3 days/70° C. | 2.42 | 2.60 | 2.37 | 2.20 | | |
| MH (IN-lb) 7 days/70° C. | 2.09 | 2.53 | 2.38 | 2.23 | | |
| MH % retained 0 days/70° C. | 1.00 | 1.00 | 1.00 | 1.00 | | |
| MH % retained 3 days/70° C. | 0.91 | 1.00 | 0.99 | 0.98 | | |
| MH % retained 7 days/70° C. | 0.79 | 0.97 | 0.99 | 1.00 | | |
| ACBD (kV/mm) | 37 | 37 | 37 | 37 | | |
| Dissipation factor (120° C., 25 kV/mm) | 0.054 | 0.031 | 0.027 | 0.038 | | 0.11 |

(D) 0.001 to 0.009% of a sulfur-containing second antioxidant that does not contain a —S(CH$_2$)$_2$CO$_2$R group, wherein R is a C6 to C20 alkyl;

(E) Optionally, an organic nitrogenous base; and (F) Optionally, a phenolic third antioxidant that does not contain a —S(CH$_2$)$_2$CO$_2$R group, wherein R is a C6 to C20 alkyl.

2. The composition of claim 1 in which the sulfur-containing first antioxidant is at least one of dimyristyl thiodipropionate, distearyl thiodipropionate, dilauryl thiodipropionate, and pentaerythritol tetrakis (B-laurylthiopropionate).

3. The composition of claim 1 in which the sulfur-containing second antioxidant is at least one of 4,4'-thiobis (2-t-butyl-5-methylphenol); thiodiethylene bis[3-(3,5-di-tert-butyl-4-hydroxyphenyl)propionate; 2,2'-thiobis(6-t-butyl-4-methylphenol); (6,6'-Di-tert-butyl-2,2'-thiodi-p-cresol); and (4,6-bis (octylthiomethyl)-o-cresol).

4. The composition of claim 1 containing an organic nitrogenous base in an amount of 0.001-0.009 wt % based on the weight of the composition.

5. The composition of claim 1 free of polyalkylene glycol.

6. The composition of claim 1 in which the ethylene-based polymer has (i) a melt index (I$_2$) from 0.1 to 100 g/10 min measured according to ASTM D1238, Condition 190° C./2.16 kg and, (ii) a density from 0.910 to 0.940 g/cc measured by the procedure of ASTM D792, Method B.

7. The composition of claim 6 in which the ethylene-based polymer is a low density polyethylene made in a tubular reactor.

8. The composition of claim 1 containing a phenolic third antioxidant in an amount from 0.05 to 0.5 wt % based on the weight of the composition.

9. The composition of claim 8 in which the sulfur-containing second antioxidant does not contain phosphorus.

10. The composition of claim 1, wherein the composition is not crosslinked and the composition retains from 0.97 to 1.00 of a maximum torque after aging for 7 days at 70° C.

11. The composition of claim 10, wherein the composition has a dissipation factor of less than, or equal to, 0.038.

12. The composition of claim 11, wherein the composition has an unaged maximum torque greater than, or equal to, 2.24 in-lb.

13. A cable comprising an insulation sheath made from the composition of claim 1.

* * * * *